United States Patent [19]

Hester et al.

[11] Patent Number: 4,630,195
[45] Date of Patent: Dec. 16, 1986

[54] DATA PROCESSING SYSTEM WITH CPU REGISTER TO REGISTER DATA TRANSFERS OVERLAPPED WITH DATA TRANSFER TO AND FROM MAIN STORAGE

[75] Inventors: Phillip D. Hester, Austin; William M. Johnson, Leander, both of Tex.

[73] Assignee: International Business Machines Corporation, Armonk, N.Y.

[21] Appl. No.: 615,984

[22] Filed: May 31, 1984

[51] Int. Cl.⁴ ............................................. G06F 13/00
[52] U.S. Cl. .................................................. 364/200
[58] Field of Search ... 364/200 MS File, 900 MS File

[56] References Cited

U.S. PATENT DOCUMENTS

| | | | |
|---|---|---|---|
| 3,401,376 | 11/1965 | Barnes | 364/200 |
| 3,447,135 | 5/1969 | Calta et al. | 364/200 |
| 3,967,247 | 6/1976 | Andersen et al. | 364/200 |
| 3,997,896 | 12/1976 | Cassarino, Jr. et al. | 364/200 |
| 4,062,059 | 12/1977 | Suzuki et al. | 364/200 |
| 4,063,078 | 12/1977 | Gupta et al. | 364/200 |
| 4,095,269 | 6/1978 | Kawabe et al. | 364/200 |
| 4,128,882 | 12/1978 | Dennis | 364/200 |
| 4,130,885 | 12/1978 | Dennis | 364/900 |
| 4,232,366 | 11/1980 | Levy et al. | 364/200 |

*Primary Examiner*—David Y. Eng
*Attorney, Agent, or Firm*—J. B. Kraft; Thomas E. Tyson

[57] ABSTRACT

The present invention is directed to a conventional data processing system having a CPU and at least one external unit such as the main storage unit acquiring data from or providing data to the CPU and I/O bus for the transfer of data between the CPU and the external unit. The apparatus of the present invention provides for transfers to and from this external unit, e.g., main storage being overlapped with a register to register data transfer routinely carried out in the CPU to implement various CPU operations and computation functions. The CPU includes apparatus for transferring data to or from said external unit over the I/O bus during synchronized time cycles. The CPU also includes local storage apparatus which comprise a plurality of registers as well as expedients for transferring data from register to register. Control apparatus controls the register to register data transfer so that such transfers are conducted during time cycles coincident with the transfer of data to or from the external storage unit. Thus, the register to register data transfers within the CPU are overlapped with the data transfers over the I/O bus to main storage. The data transfers to and from main storage are generally considerably longer that the simpler register to register data transfer. The apparatus may be operated so that several register to register transfers may take place during the time required for a transfer of data to or from the external storage unit. The present invention further includes means for dynamically determining data dependencies between the register to register transfers and the I/O bus transfers.

6 Claims, 8 Drawing Figures

HOLD-OFF COMPARE OPERATION

DESTINATION COMPARE OPERATION ("CANCEL LOGIC")

REGISTER TO REGISTER

MAIN STORAGE TRANSFER

DATA PROCESSING SYSTEM WITH CPU REGISTER TO REGISTER DATA TRANSFERS OVERLAPPED WITH DATA TRANSFER TO AND FROM MAIN STORAGE

TECHNICAL FIELD

The present invention relates to data processing systems and particularly to data processing systems having a primary I/O bus to main storage and other I/O devices.

BACKGROUND ART

In the data processing art including present day microprocessor technology, it is a known expedient to use pipelining on the primary I/O bus or channel between the CPU and external units such as main storage and the various I/O devices, e.g., disk, display or printer. Such pipelining involves overlapped transactions on the I/O bus, i.e., a plurality of data transfers to and from various I/O devices or units or main storage may be overlapped on the primary I/O bus. In other words, the I/O bus needn't be locked into a single transaction; a first transaction may be initiated and before it is completed a second and a third transfer transaction involving the I/O bus may be initiated. Some typical patents describing such pipelining are Calta et al, U.S. Pat. No. 3,447,135, Peripheral Data Exchange; Dennis, U.S. Pat. No. 4,130,885, Packet Memory System for Processing Many Independent Memory Transactions Concurrently; Levy et al, U.S. Pat. No. 4,232,366, Bus for a Data Processing System with Overlapped Sequences; Dennis, U.S. Pat. No. 4,128,882, Packet Memory System with Hierarchical Structure; and Cassarino, Jr. et al, U.S. Pat. No. 3,997,896, Data Processing System Providing Split Bus Cycle Operation.

While the art has recognized the need to overlap such data transfers and external units over I/O buses to speed up data processing operations, there appears to have been little consideration given to the overlapping of such external transfers with storage transfers that take place within the CPU itself. The CPU in carrying out its operational and computing functions must conduct extensive register to register transfers within the local storage means in the CPU. In present day microprocessor technology, such local storage means may customarily comprise a plurality of RAM registers in which the data fetched from the external main storage is temporarily stored while it is being manipulated in the CPU. Such data manipulation normally requires a great number of register to register transfers within CPU. Such register to register transfers are relatively short in duration, normally requiring an effective throughput one CPU time cycle to complete. In contrast, transfers over the I/O bus to main storage or other I/O devices are much longer, normally requiring three or more CPU time cycles to complete. In a great many conventional data processing systems, it has been customary to employ a memory cache expedient in the CPU so that a substantial number of data transfer transactions from the I/O bus to main storage or other I/O devices may be carried out during time periods previous to their use in the CPU and stored or buffered in the storage cache associated with the CPU. In systems utilizing such a cache, the relatively long times required to transfer data from storage or other I/O devices may not present a problem in that a great many of the instructions or other data required from main storage to carry out CPU operations or computations have been prestored in the CPU cache and are immediately available.

However, with the development of microprocessors, there has been a trend to eliminate or greatly curtail the size of CPU caches because of technology space limitations resulting from the size of the semiconductor substrate in which the various microprocessor circuits are formed. Accordingly, technology presents a problem of how to eliminate the need for cache space and yet maintain the high operational speeds required of microprocessors.

DISCLOSURE OF THE INVENTION

The present invention provides a solution to the microprocessor problem of maintaining high processing speeds while eliminating or substantially reducing CPU storage caches by providing apparatus in which the register to register data transfers required for CPU computations and other operations are conducted coincidentally or overlapped with transfer of data to and from main memory storage or other I/O units.

The invention is directed to data processing systems comprising a CPU, at least one external unit such as main storage requiring data from or providing data to the CPU, and I/O bus for the transfer of data between the CPU and the external unit. The present CPU comprises means for transferring data to and from the main storage or other external unit over the I/O bus during synchronized CPU time cycles. CPU further includes local storage means which comprise a plurality of registers, means for transferring data from register to register in such local storage means, and control means for controlling the register to register data transfer so that it is conducted during time cycles coincident with the transfer of data to or from the external units.

Because there is often a data dependency between the data transferred between CPU and external unit and said register to register transfer data, control means further include means for dynamically determining this data dependency.

In carrying out the present invention in order to dynamically determine data dependencies, the means for transferring data to and from the external storage unit includes means for generating data transfer commands, means for assigning a register in said local storage to and from which data is to be transferred, and means for storing a tag identifying the assigned register. The system further includes means for comparing subsequent data transfer commands and register to register transfer commands to the stored tags.

BRIEF DESCRIPTION OF DRAWINGS

Referring now to the drawings, wherein a preferred embodiment of the invention is illustrated, and wherein like reference numerals are used throughout to designate like parts.

BEST MODE FOR CARRYING OUT THE INVENTION

Figure 1:
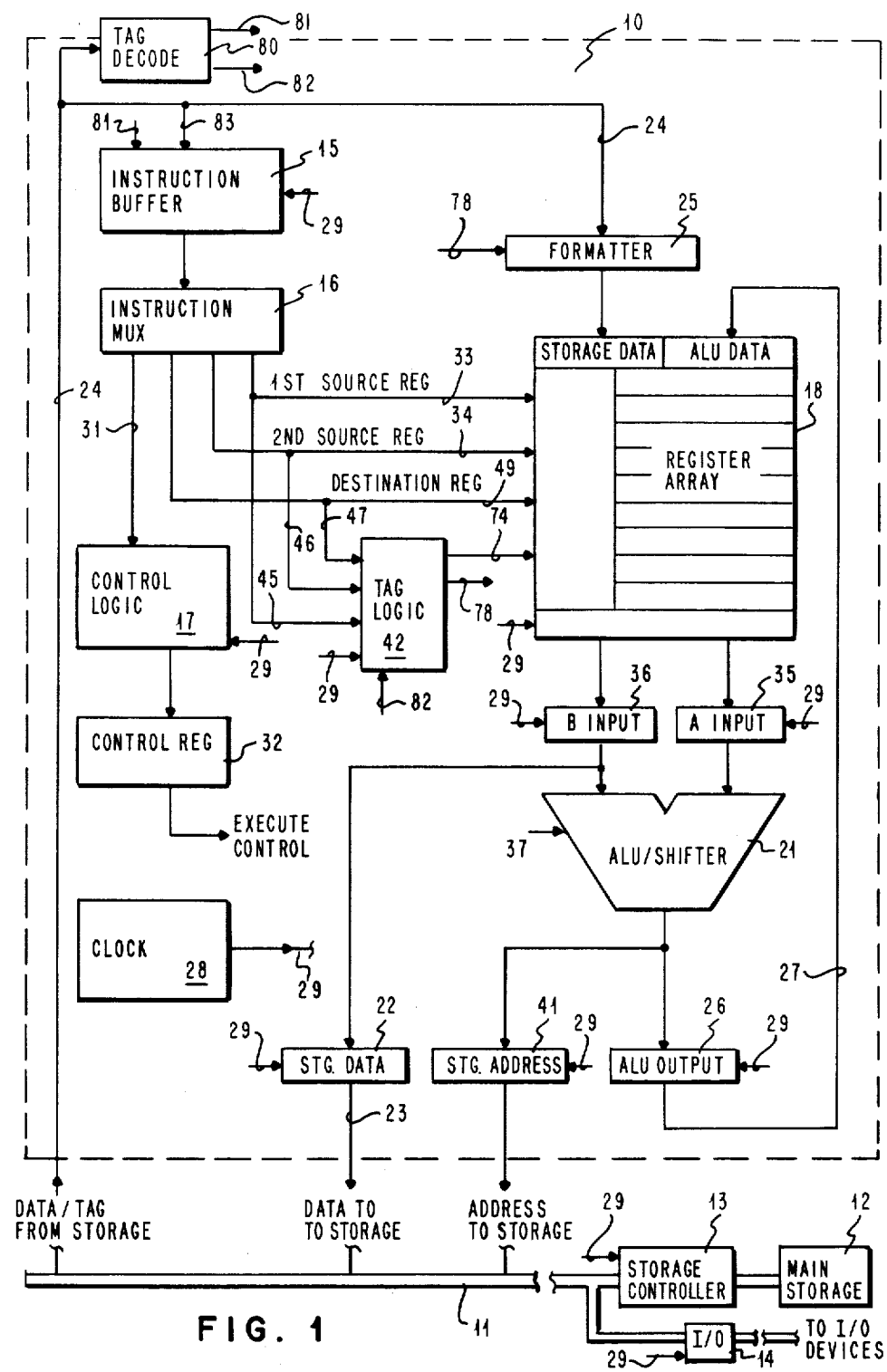
FIG. 1 is a logical block diagram showing the CPU apparatus involved in the present invention in a generalized form.

With reference to FIG. 1, a generalized diagram of the apparatus which may be used to carry out the present invention is shown. The pertinent elements of the present invention are shown to be contained within CPU 10 which communicates over I/O bus or channel 11 with main memory storage 12 through storage controller 13 and with various I/O devices such as diskette drives, printer or display (not shown) via I/O bus controller 14. The CPU 10 may be implemented using any conventional microprocessor. Before describing the particulars of the present invention, general operation of the CPU insofar as pertinent to the present invention will now be described. When the CPU is operational, instructions to be carried out are fetched from storage in the conventional manner and temporarily stored in an instruction buffer 15. As will be hereinafter described, instruction multiplexer 16 breaks up the instruction, a portion of which goes to control logic 17 to control CPU operations as will be hereinafter described and a portion to various registers in the register array 18 which provides the local storage means for the CPU. From register array 18, data may be transferred through the ALU/Shifter 21 where various computorial operations may be carried out or to main storage via register 22, bus 23 and I/O bus 11. Data from main storage may be returned to the CPU via bus 11, bus 24, formatter 25 which will be subsequently described in greater detail back to register array 18. In addition, data may be returned from the ALU/Shifter 21 back to register array 18 via ALU output register 26 and bus 27. It should be understood that a great many transactions within the CPU may involve operations on the contents of the registers in array 18. These will be referred to as register to register data transfers. Other transfers will be to and from main storage 12 or I/O bus controller 14 via I/O bus 11.

Transfers to and from main storage 12 or I/O devices via I/O bus 11 take considerably longer than register to register transfers. In this connection, it should be noted that the operation of the CPU 10 is a synchronous operation under the control of clock 28 which produces a regular cyclic output on clock line 29 which is applied to all of the major elements in CPU 10 as well as to storage controller 13 and I/O controller 14 so that the overall data processing system is synchronized based upon CPU time cycle determined by the clock. The clock is a conventional circuit for producing standard CPU time cycle or synchronized operations. In such operations, a register to register data transfer within register array 18 of CPU 10 will take in the order of one CPU cycle while a transaction involving transfers to and from main storage 12 or I/O devices could take three or more of such CPU time cycles.

Figure 2:
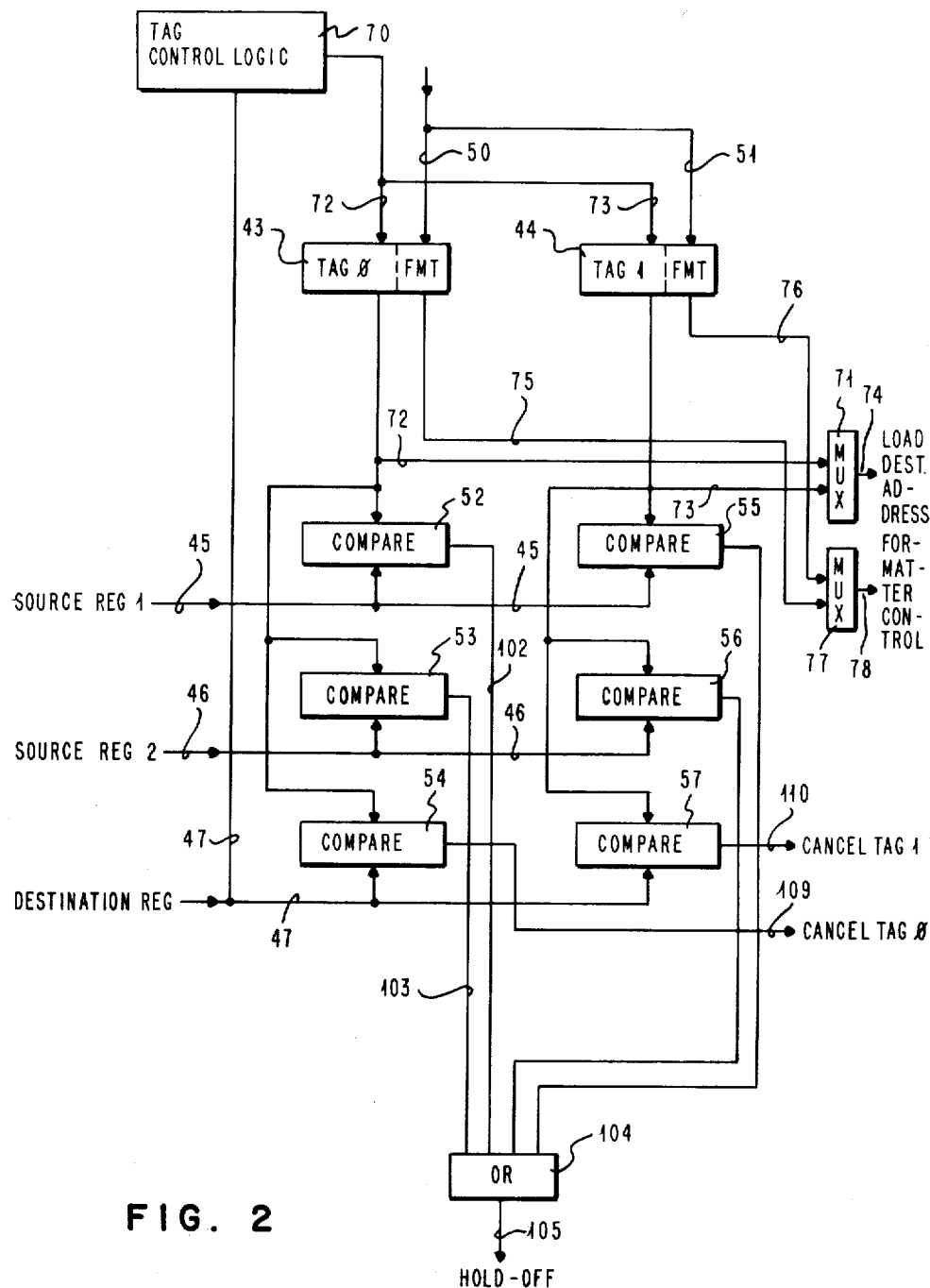
FIG. 2 is a logic block diagram more specifically showing the logic units involved in the tag logic unit of FIG. 1.
Figure 3:
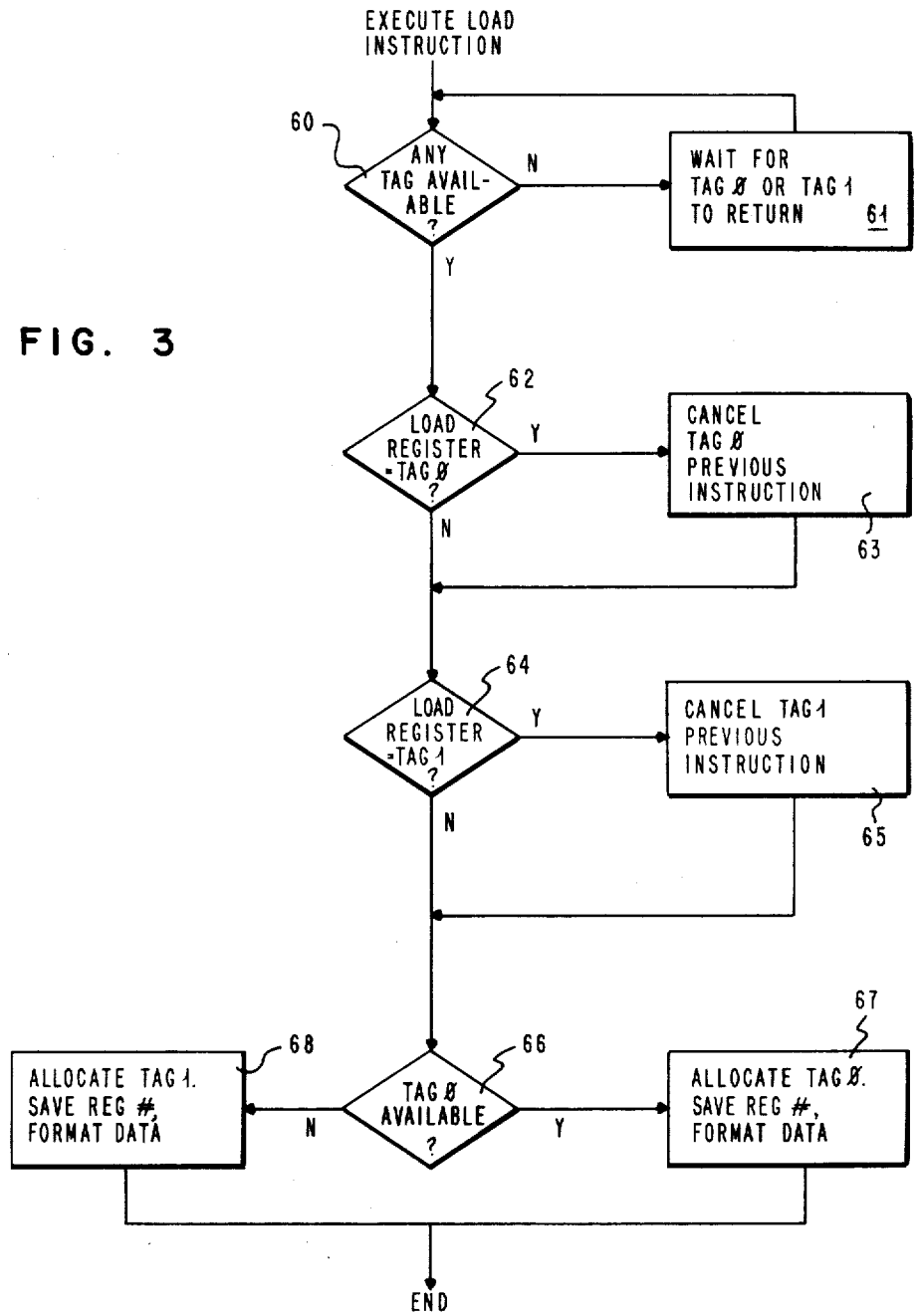
FIG. 3 is a flow chart of the tag operation for load instruction involved in the present invention.

At this point we will describe the operation of the pertinent logic in the CPU of FIG. 1 as well as the details of the tag logic in FIG. 2 with respect to transactions involving both register to register transfers and transfers to and from storage on the I/O bus 11.

Figure 7:
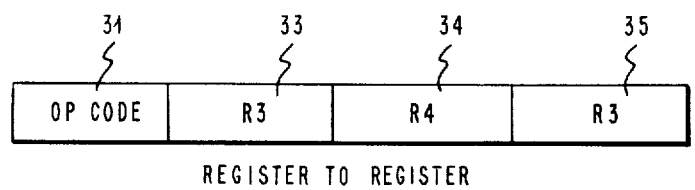
FIG. 7 is a diagram of a register to register transfer instruction.
Figure 8:
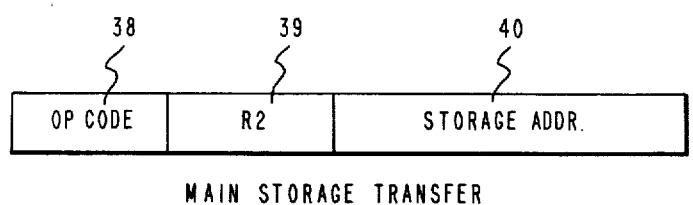
FIG. 8 is a diagram of a main storage transfer instruction.

Instructions, either already in CPU 10 or obtained from main storage are stored in instruction buffer 15. The instruction may be for a register to register transfer in which case it will have the format shown in FIG. 7 or it will be a transfer to or from main storage or other I/O external unit devices in which case it will have the format shown in FIG. 8. Let us first consider a register to register transfer instruction having the format shown in FIG. 7. Instruction multiplexer 16 will divide the instruction as follows. The OP code 31 which indicates the type of instruction to be performed is applied to control logic 17 which will control the execution of the function by applying execute instructions through control register 32 (FIG. 1). For the purpose of this illustration, let us assume that we have an add function. The next two sections 33 and 34 of the instruction in FIG. 7 indicate the contents of the source registers. In the instruction shown in FIG. 7 R3 and R4 are the two source registers which are to be involved in the computation. Finally, the last section 35 indicates the destination register. Thus, in the illustrated instruction in FIG. 7, contents of register 3 and register 4 are to be added and placed in destination register 3. As a result, signals are applied along lines 33 and 34 resulting in the reading of the contents of the first and second source registers which will result in R3 and R4 being read. The control register 32 will contain the add function resulting from the reading of the operational code. This add operational code will be applied to the ALU/Shift via execute control output from register 32 to have the ALU to have the contents of the first and second source registers, i.e., R3 and R4 latched in input registers 35 and 36 to ALU 21. We are now at the end of the fetch phase.

During the next phase, the execute phase, the control information, i.e., the add function, in control register 32 is used to control the operation to be carried out. Control code from control register 32 is applied to the ALU/Shifter via input 37. The operation in the ALU is performed in the conventional manner, and results of the operation are latched in ALU output register 26. During the next phase (which may be referred to as write back), the result of the ALU operation is written back or returned via bus 27 to the destination register, in the present example, R3 as indicated by the destination register input 49.

Each of these operations, i.e., fetch, execute and write back is performed in a single CPU time cycle. While we have illustrated the carrying out of a single instruction, it should be noted that consecutive instructions are overlapped so that when a first instruction is in its execute phase, a second instruction may be initiated into its fetch phase, and when a first instruction is in its store back phase, the second instruction may be in its execute phase and a third instruction may be in its initial fetch phase. As a result, because of the overlapping of three instructions, while the normal internal CPU operation involving register to register transfers take three CPU time cycles to complete, the actual throughput of the CPU is one complete operation per cycle.

A transaction involving a transfer to or from main storage is carried out in a similar fashion in so far as CPU operations are concerned. It is controlled by the main storage transfer instruction shown in FIG. 8. The instruction involves an OP code which is divided out by instruction multiplexer 16 through control logic 17 and applied to control register 32 indicating the type of storage operation, i.e., either store (write into main storage) or load (read out of main storage) This OP code is applied to the ALU/Shifter 21 as previously described via input 37. Section 39 of the main storage transfer instruction indicates that the contents of register R2 in register array 18 is to be stored or written into main storage or in the case of a load operation, the destination register into which data read from main storage is loaded. Consequently, at the end of the fetch CPU time cycle, in a store operation this data to be written will be latched in register 36. At the end of this same fetch time cycle, the storage address section 40 of the instruction is latched in A input register 35. Next, during the execute phase, the contents of register 36, i.e., the data to be stored, is transferred to the storage data register 22 while ALU/Shifter 21 calculates the storage address from the contents of A input register 35 and puts this storage address in storage address register 41. Then, during the store back time cycle, the storage data contents of register 22 and the storage address contents of register 41 are transferred along I/O bus 11 to storage controller 13. Thus, the transfer of data from the CPU to storage controller 13 has taken three CPU time cycles. Because of the operation of main storage with respect to the storage controller it will take another three CPU time cycles to either write the data into main storage in a store operation or read the data from main storage 12 back to a designated register in register array 18 in CPU 10 in a load operation.

As will be described hereinafter in greater detail, with the equipment of the present specific embodiment, it is possible to overlap two transfers to or from main storage with each other since it takes six CPU time cycles to complete a transfer to or from main storage, with the overlap of two of these transfers, the effective throughput is one complete transfer to or from main storage in three CPU time cycles. Since, as we have indicated above, the effective throughput of an internal register to register transfer within the CPU is one register to register transfer per CPU time cycle, the effective throughput of the apparatus is such that while one transfer to or from main storage is taking place, three register to register transfers within the CPU may coincidentally take place.

We have indicated above that the apparatus of the present invention is capable of dynamically determining data dependencies, determining whether sufficient previous operations have been completed to provide the data required in the subsequent operation. An example of this situation can occur when in a sequence of operation, an execution of an instruction is requested before the execution of a previously commenced but overlapped instruction which would provide data required by the subsequent instruction has been completed. This occurs on a main storage transfer instruction (FIG. 8) which is a load instruction whereby section 39 will indicate a destination register in array 18 to which data read from main storage will be loaded. Thus, when data required by a subsequent instruction is not as yet available in the destination register because the previous overlapping instruction has not as yet been completed, there must be a "hold off" or waiting of the execution of the subsequent instruction until the previous instruction is completed. This function is carried out by the tag logic 42 of FIG. 1 which is shown in detail in FIG. 2. This tag logic function will now be described with respect to FIGS. 1 and 2.

The tag logic shown in FIG. 2 has two tag registers, tag 0 and tag 1 which will keep track of registers in register array 18 and will function as destination registers for keeping track of load transfers from main storage 12 back to the designated array register which is respectively identified by either the tag 0 register or the tag 1 register. Accordingly, after multiplexing, the first and second source registers which will be used to determine the storage address (FIG. 8) are applied to array 18 via lines 33 and 34 and are also respectively applied to the tag logic shown in FIG. 2 via lines 45 and 46. This input will be used to determine hold-offs in a procedure to be subsequently described. Likewise, contents of destination register section 39 (FIG. 8) is applied to tag logic (FIG. 2) via line 47. The destination register number is stored in either tag 0 register 43 or tag 1 register 44 depending on the availability of either the tag 0 or the tag 1 registers. In any event, because of the availability of only two registers, tag 0 and tag 1 in the present embodiment, only two load transfers from main storage may be overlapped or carried on simultaneously. The transaction to main storage is then carried on as described hereinabove. However, with such a load instruction, during the execute phase, the control logic 17 through control register 32 and execute control line (FIG. 1) applies to either the respective tag 0 or tag 1 register format data along lines 50 and 51. This format data which is stored in the FMT portion of respective tag 0 and tag 1 registers will be used to properly format the data which is to be loaded when it returns from main storage. Conveniently, the format (FMT) data will indicate what portions of the data received from main storage are to be loaded into the appropriate register in array 18 designated by either the tag 0 or tag 1 register. Tag 0 register 43 has associated therewith compare units 52, 53 and 54 for respectively comparing the two source register lines 45 and 46 as well as the destination register line 47 with the destination register stored in tag 0 register 43. Likewise tag 1 register 44 has associated therewith compare units 55, 56 and 57 but likewise comparing the inputs on lines 45, 46 and 47 with the contents of tag 1 register 44.

Now with reference to the logic shown in FIG. 1 and particularly in FIG. 2, there will be described with reference to the flow charts of FIGS. 3–6 a series of operations involving the tag logic with respect to situations in which one or more of the overlapped instructions being executed involves a main storage transfer instruction involving a load into one of the registers of register array 18. With respect to the flow chart of FIG. 3, during the execution of a load instruction, a determination is made, step 60, as to whether a tag register (0 or 1) is available. If none is available, then step 61, the instruction awaits the availability of a tag 0 or tag 1 register. On the other hand, if a register is available, then a determination is made, step 62, as to whether the tag 0 register has already been used for a previous load instruction that is not as yet complete which designates the same destination load register in array 18. If this is the case, then, step 63, the whole previous instruction involving tag 0 is cancelled. After the cancellation of the previous instruction involving tag 0 or if the tag 0 register has not been used to designate a load register, then, step 64, a determination is made as to whether the tag 1 register has already been used for a previous load instruction which is not as yet complete which designates the same destination load register in array 18. If this is the case, then, step 65, the whole previous instruction involving tag 1 is cancelled. At this point, a determination is made, step 66, as to whether the tag 0 register is available. If it is, then tag 0 register is allocated to save the load register number of the current instruction and the format information is applied via line 50 (FIG. 2) to tag register 0. On the other hand, if the tag 0 register is not available, then the tag 1 register must be available. Consequently, it is allocated to the load register of the current instruction and the format data is applied via line 51. The tag operation is set forth in step 60–68 is carried out under the control of tag control logic 70 which communicates with the tag 0 and the tag 1 registers via lines 72 and 73.

The outputs of tag 0 register 43 is applied to multiplexer 71 via line 72 while the output of tag 1 register 44 is applied to multiplexer 71 via line 73. This multiplexed output of multiplexer 71 is applied to register array 18 over line 74 to provide to register array 18 the destination register address where data returned from main storage over line 24 is to be loaded in register array 18. Lines 75 and 76 similarly apply to multiplexer 77. The format control data (FMT) respectively is stored in association with tag register 0 and tag register 1 so that multiplexer 77 can provide an output along line 78 to formatter 25 indicative of the format of the data to be loaded in the designated register.

Figure 6:
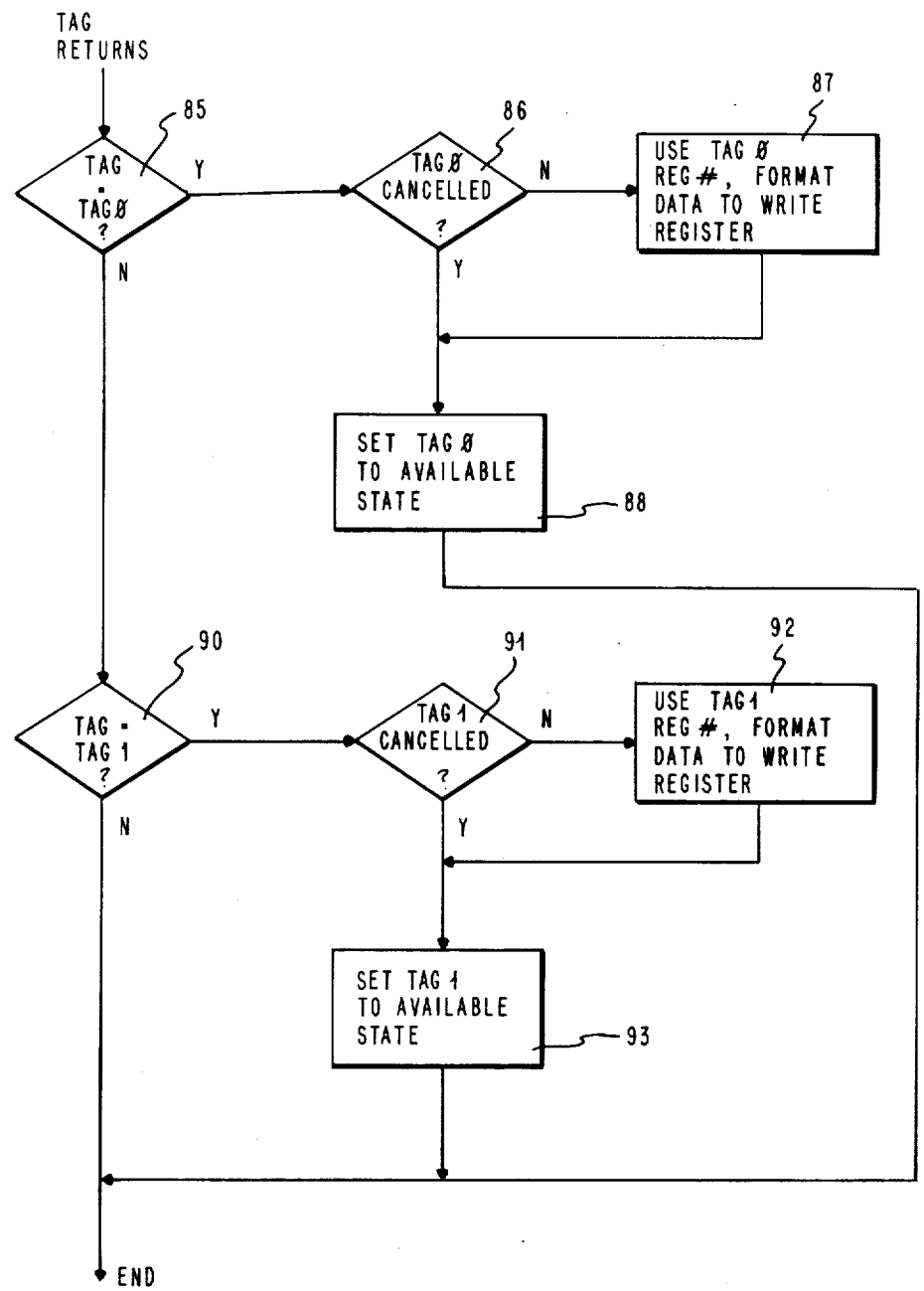
FIG. 6 is a flow chart of the operations involved in the tag return procedure of the present invention.

With respect to FIG. 6, we will now consider the procedure involved in decoding the tag that accompanies the data returned from storage, particularly the tag indicative of the tag 0 or tag 1 register. The data returned from storage along bus 24 is monitored by tag decode logic 80 which determines whether the tag is one of several conventional tags indicating an instruction fetched from storage or one of the pair, tag 0, tag 1. If the tag is indicative of an instruction, the tag code logic signals the instruction buffer 15 via line 81 to load the instruction in the instruction buffer via line 83. On the other hand in the case of tag 0, tag 1, the logic of tag decode 80, performs the procedure shown in FIG. 6 in determining if the tag is a tag 0 or tag 1 indicator. First, step 85, a determination is made as to whether the tag is indicative of the tag 0 register. If it is, then, step 86, a further determination is made as to whether tag 0 has been cancelled. A tag is cancelled when its associated register has been overwritten so that the load associated with the tag is no longer valid. Thus, if the tag has not been cancelled, then, step 87, the data is loaded into the register of array 18 indicated in the tag 0 register. This is done by having the tag decode 80 issue a signal on line 82 (FIG. 1) to tag logic which in turn causes tag control logic 70 in FIG. 2 to have the tag 0 register 43 put out its contents on line 72 which in turn passes through multiplexer 71 from which the appropriate load register destination which has been stored in the tag 0 register is applied over line 74 to register array 18. Similarly the format data in tag register 0 is applied via line 75 through multiplexer 77 and line 78 to provide the requisite format control. At this point, (FIG. 6) or if a determination has been made in step 86 that the tag 0 had been cancelled, then, the tag 0 register is set to an available state, step 88.

On the other hand, if a determination was made in decision step 85 that the tag associated with the data from storage is not a tag 0, a determination is then made in step 90 of whether the tag is a tag 1. Then, steps 91, 92 and 93 respectively the same as steps 86, 87 and 88 are carried out with respect to the tag 1 register.

Now with reference to FIG. 4 and with the logic of FIG. 2 there will be described compare function carried out by the compare logic for all instructions including both register to register as well as transfers to and from main storage and I/O units. First, step 100, FIG. 4, a determination is made as to whether either source register equals the register in tag 0. This comparison is made using compare units 52 and 53 in FIG. 2. If there is such a comparison, then it indicates that there is a data dependency on the contents of the register indicated by tag 0 and, step 101, the system is put into a wait state. In FIG. 2 this is accomplished by an output on either line 102 or 103 respectively resulting from a compare on either compare unit 52 or compare unit 53 causing OR gate 104 to produce a hold output on line 105 to control logic 17.

If it is determined in step 100 (FIG. 4) that neither source register equals a tag 0 register, then, the operation proceeds to step 106, and the above procedure is repeated with respect to the tag 1 register 44 (FIG. 2) using compare units 55 and 56.

A compare leads to step 107 resulting in a wait or hold off until the register indicated in the tag 1 register is finally loaded by return from main storage.

Figure 4:
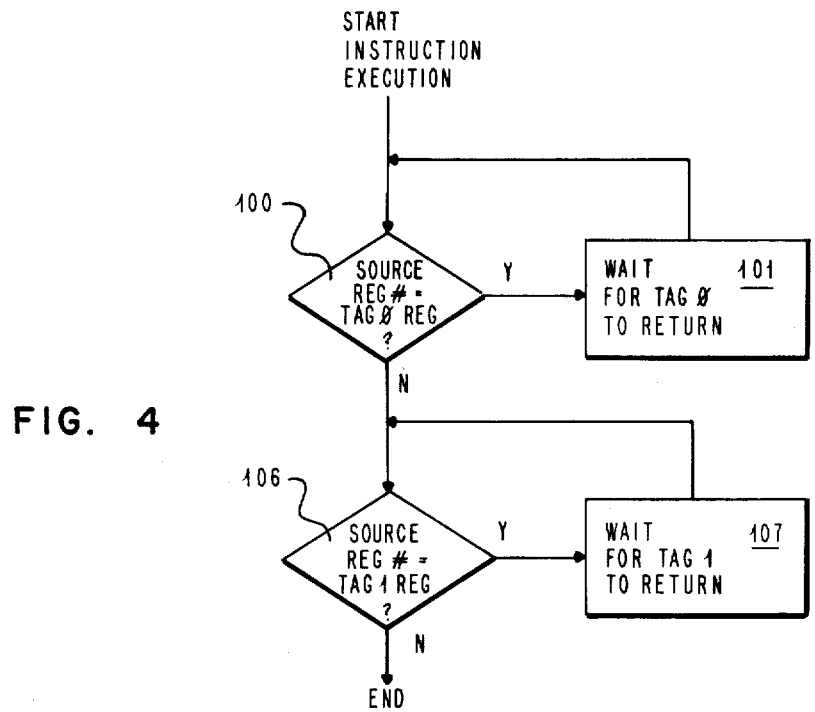
FIG. 4 is a flow chart of the operations involved in the hold-off tag compare operation involved in the present invention.
Figure 5:
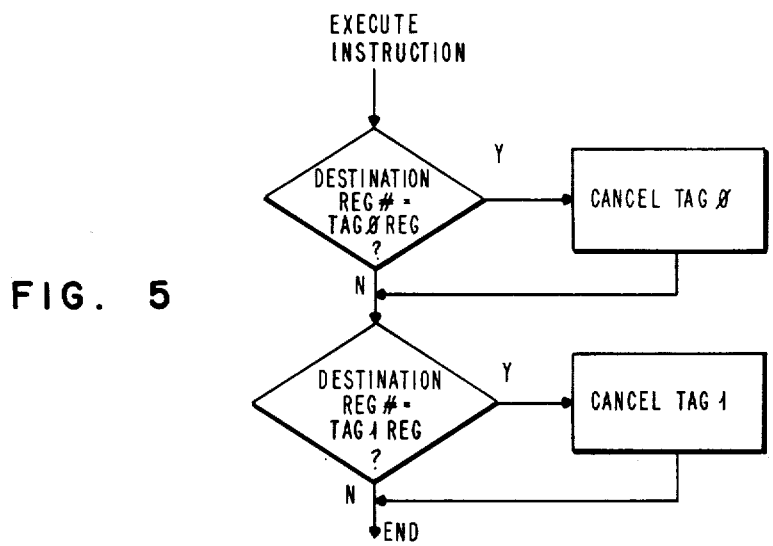
FIG. 5 is a flow chart of the operations involved in the destination compare operation of the present invention.

With respect to FIG. 2, it should be noted that in addition to comparing source registers in a given instruction as described with respect to the procedure of FIG. 4, the destination register in the instruction applied via line 47 is also compared to tag 0 register 43 and tag 1 register 44 respectively by compare unit 54 and compare unit 57 resulting in either an output cancelling the tag 0 register on line 109 to control logic 17 or cancelling the tag 1 register on line 110 control logic 17. This procedure is shown in the flow chart of FIG. 5. The cancel procedure shown with respect to FIGS. 5 and 2 covers the situation where a subsequent command transfers data to the load destination register indicated by a previous command before the transfer involved in the previous command is completed. In such a case, the assigned destination of the previous command is cancelled thereby, in effect, cancelling the previous command.

While the invention has been particularly shown and described with reference to a preferred embodiment it will be understood by those skilled in the art that various other changes in form and detail may be made without departing from the spirit and scope of the invention.

We claim:

1. In a data processing system including a CPU, at least one external unit requiring data from or providing data to said CPU and an I/O bus for the transfer of said data between said CPU and external unit, said CPU comprising:

means for executing a sequence of instructions including a first instruction;

means connected to the executing means for transferring data to or from said external unit over said bus during synchronized CPU time cycles, means connected to the executing means for storing data in a plurality of registers within said CPU, means connected to the transferring means and storing means for internally transferring data within said CPU registers concurrently during the transfer of data to or from the external unit, and control means connected to the executing means, transferring means and storing means for controlling the transfer of data wherein the transfer of data between CPU registers coincides with the transfer of data to or from the external unit, said control means further including means for
- determining when data required for execution of a first of a sequence of instructions in said CPU has not been stored in one or more of the CPU registers as required by the first instruction and
- delaying the execution of the first instruction until such data is stored in the one or more registers while permitting the execution of other instructions of said sequence that do not require any data resulting from the execution of said first instruction.

2. The data processing system of claim 1 wherein said external unit is an external data storage unit.

3. The data processing system of claim 2 wherein said control means includes
- means for generating data transfer commands to the external unit transfer means,
- means for assigning a register in said CPU storing means to which data is to be transferred, and
- means connected to said assigning means for storing a tag identifying said assigned register in a tag register in the control means, for comparing subsequent data transfer commands to the stored tags to determine if data for these subsequent data transfer commands includes data resulting from the external unit transfer command, for clearing said tag in the tag register when the external unit data transfer is complete, and for delaying the execution of any subsequent data transfer commands requiring data from the result of this external unit data transfer until the tag has been cleared.

4. The data processing system of claim 3 wherein said control means further includes
- means for cancelling a previous data transfer command in the event that a subsequent data transfer command assigns the same register assigned by the previous command before the previous command transfer is completed.

5. The data processing system of claim 4 wherein
- said storing means includes means for generating register to register transfer commands, and
- said control means further includes means for comparing said register to register transfer commands to said stored tags and for cancelling a previous data transfer command in the event that a subsequent register to register transfer command transfers data to the same register assigned by the previous command before the previous command transfer is completed.

6. The data processing system of claim 5 wherein said transfers to and from said external unit require a greater number of CPU time cycles than do said register to register transfers.

* * * * *